E. G. DENNISTON.
MACHINE FOR ATTACHING BUTTONS ON CARDS.
APPLICATION FILED MAY 19, 1908.
1,145,353.
Patented July 6, 1915.
9 SHEETS—SHEET 2.
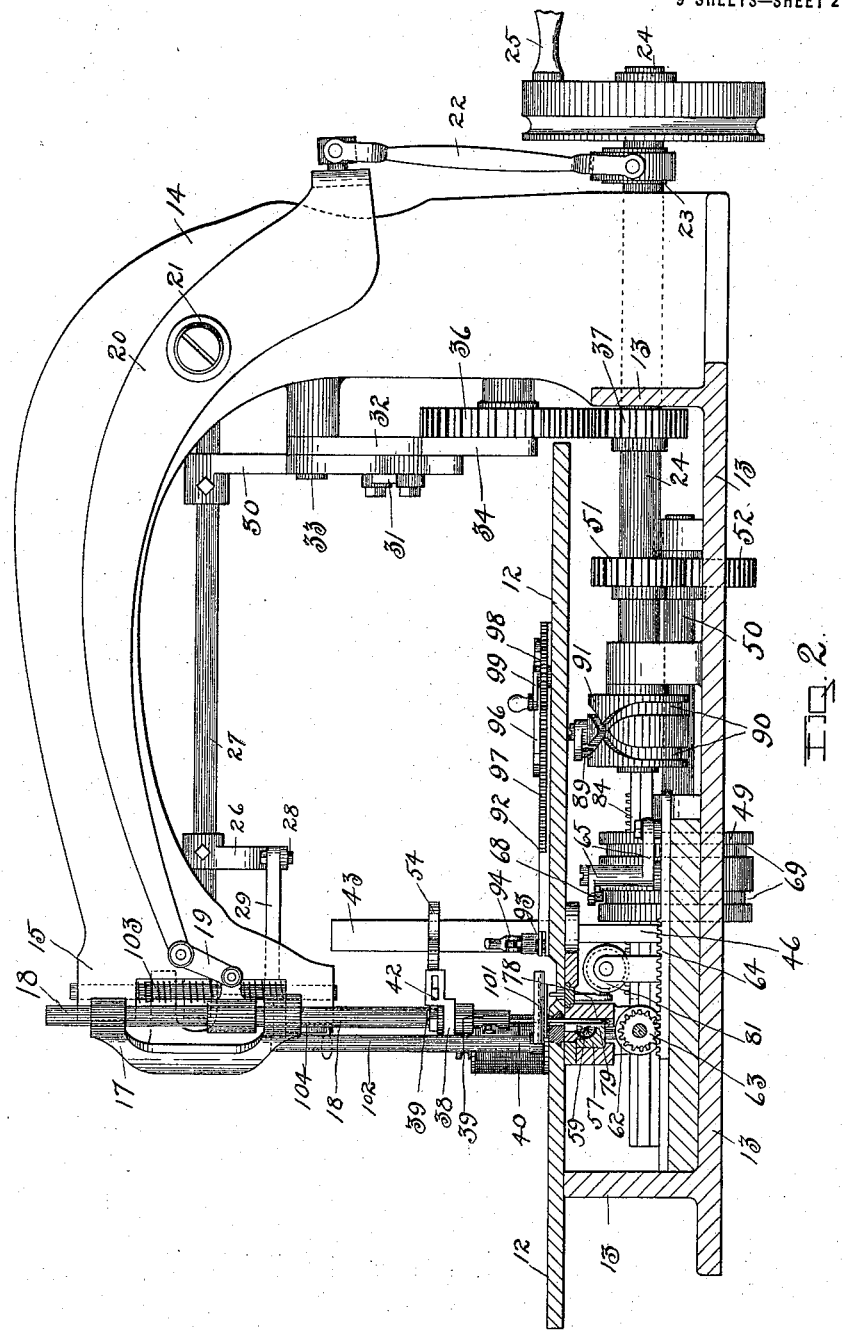

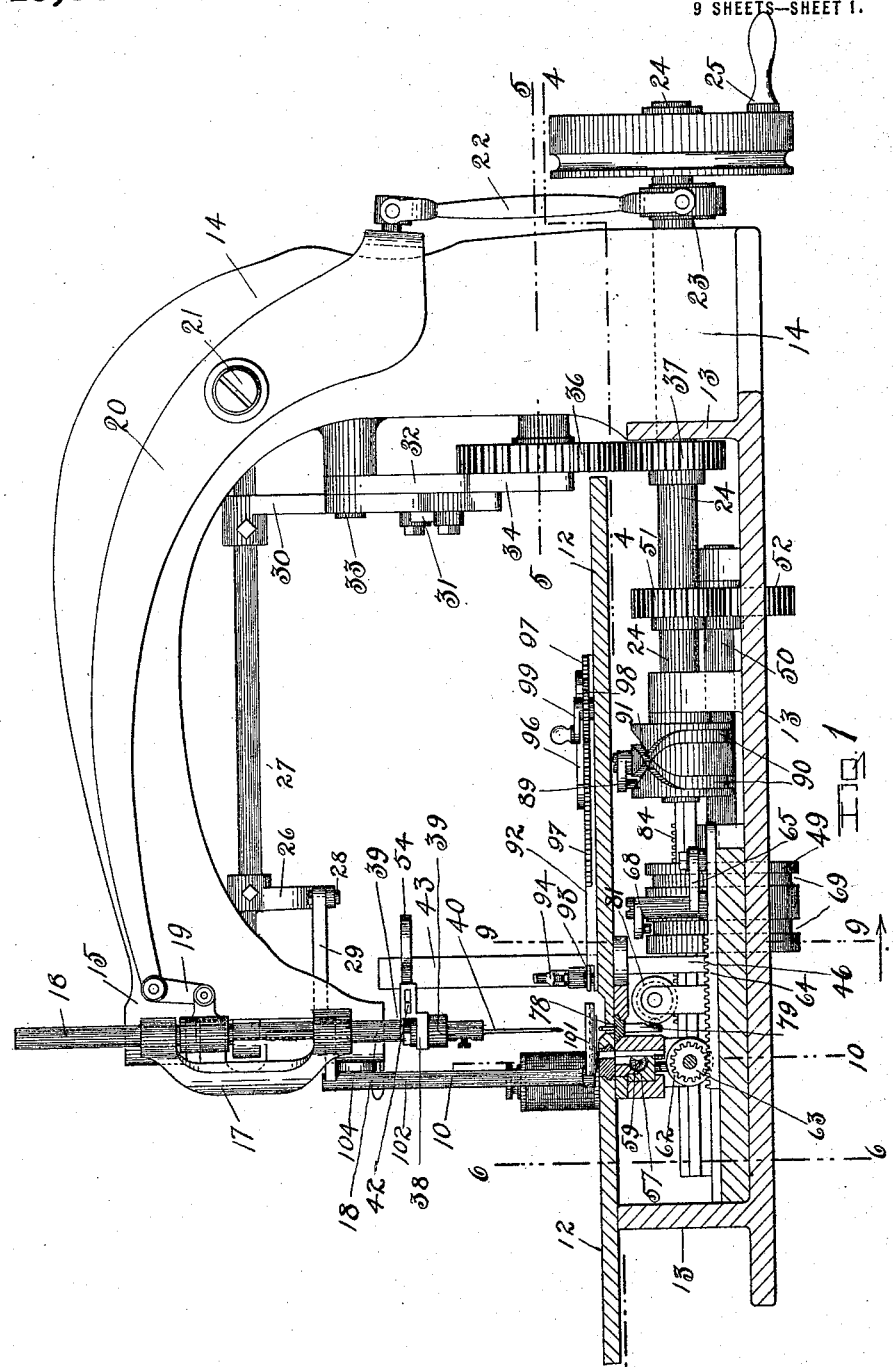

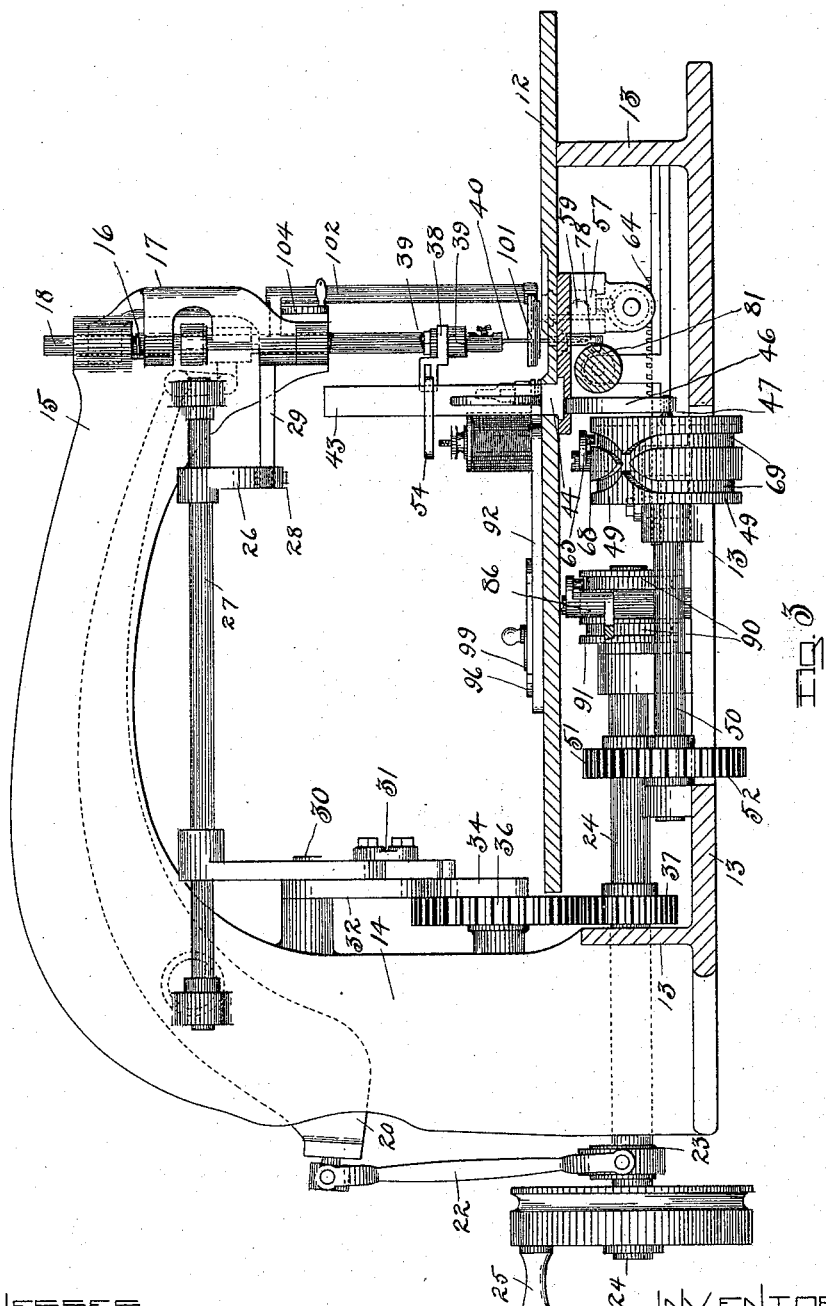

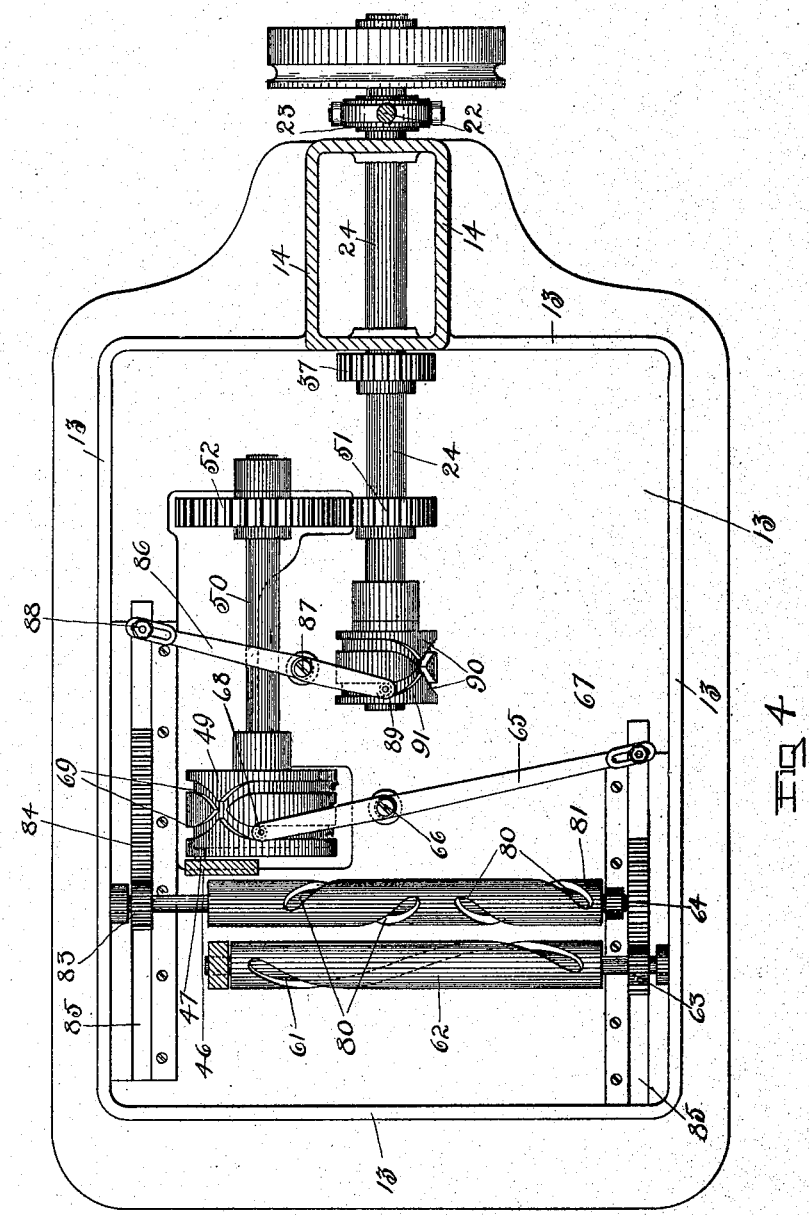

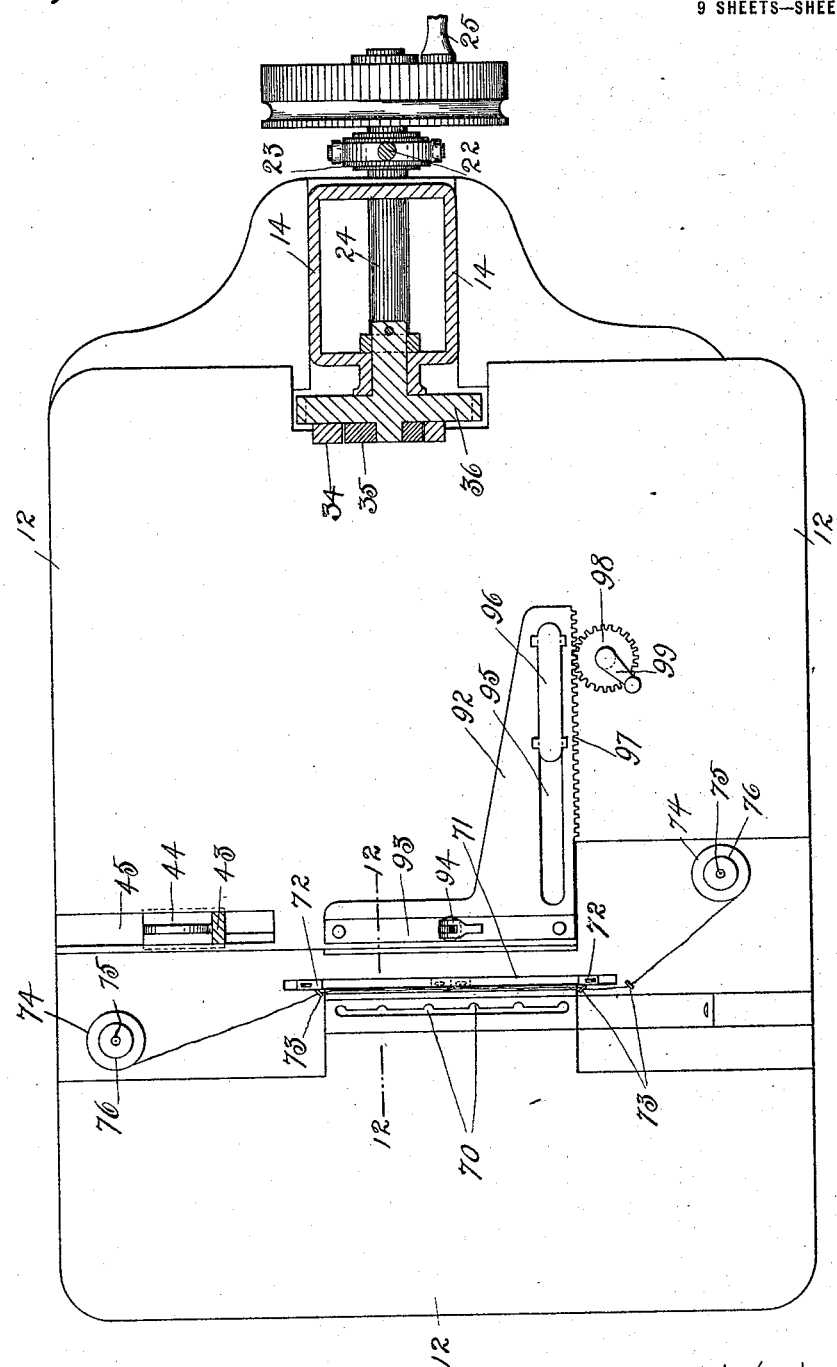

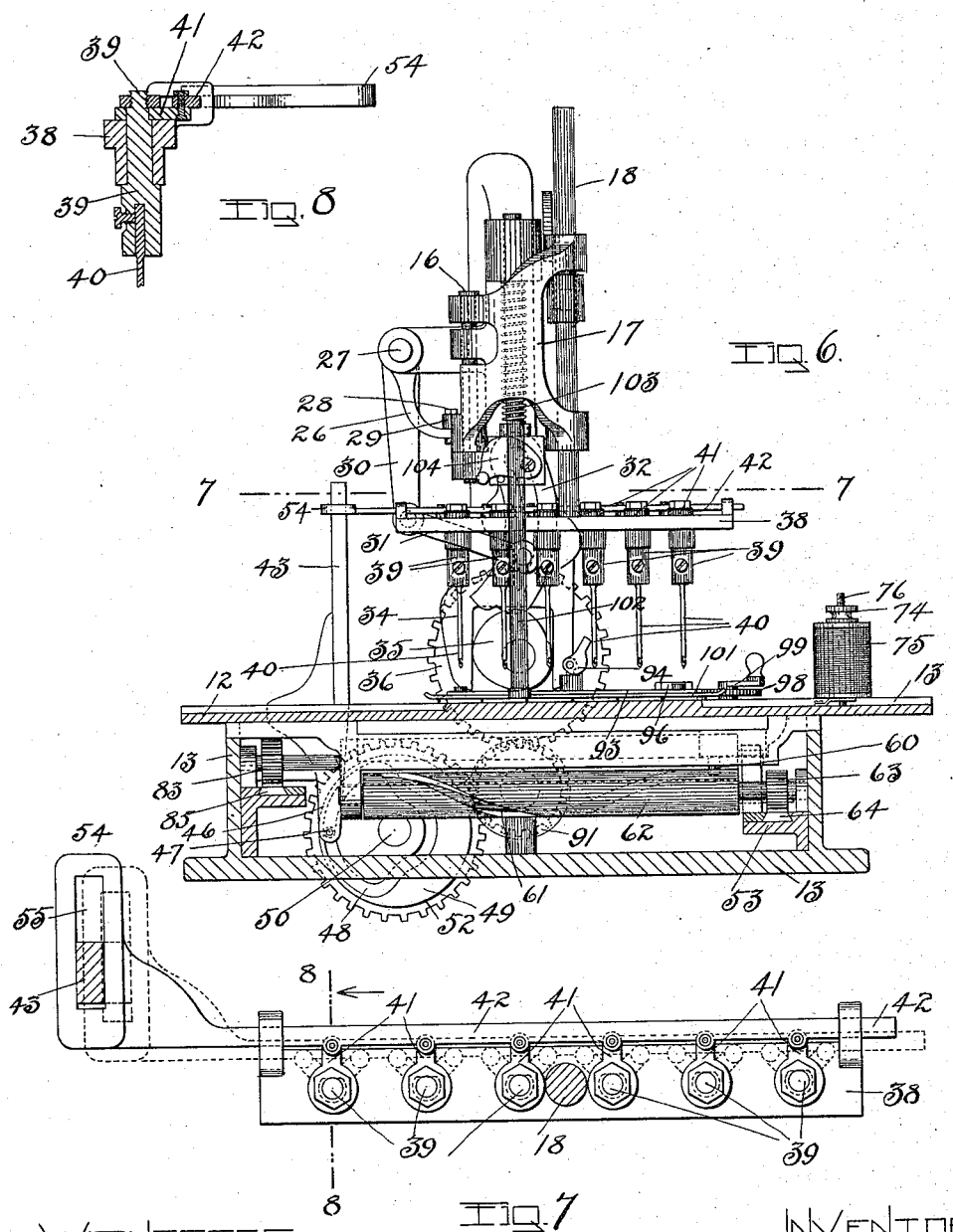

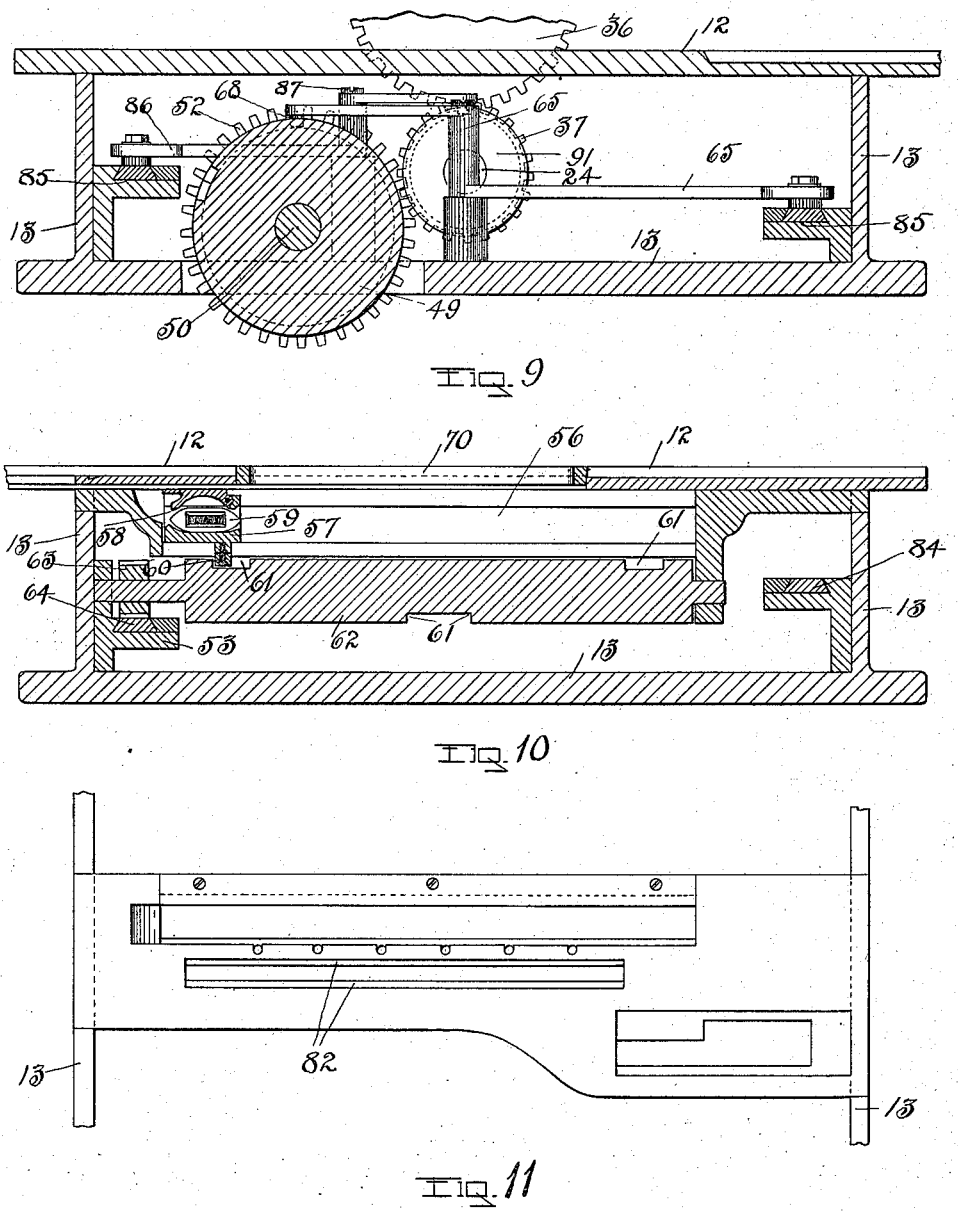

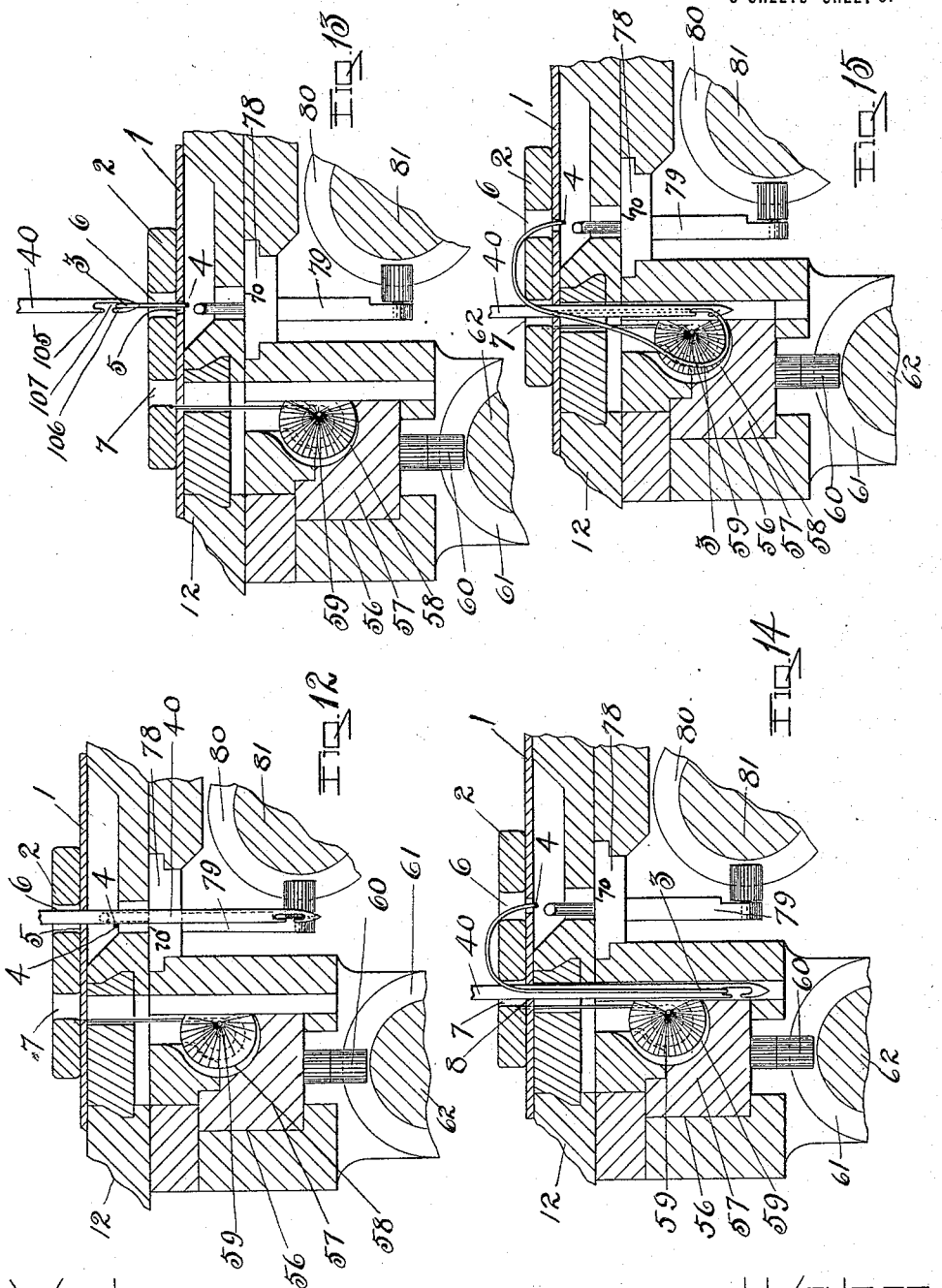

E. G. DENNISTON.
MACHINE FOR ATTACHING BUTTONS ON CARDS.
APPLICATION FILED MAY 19, 1908.
1,145,353.
Patented July 6, 1915.
9 SHEETS—SHEET 9.
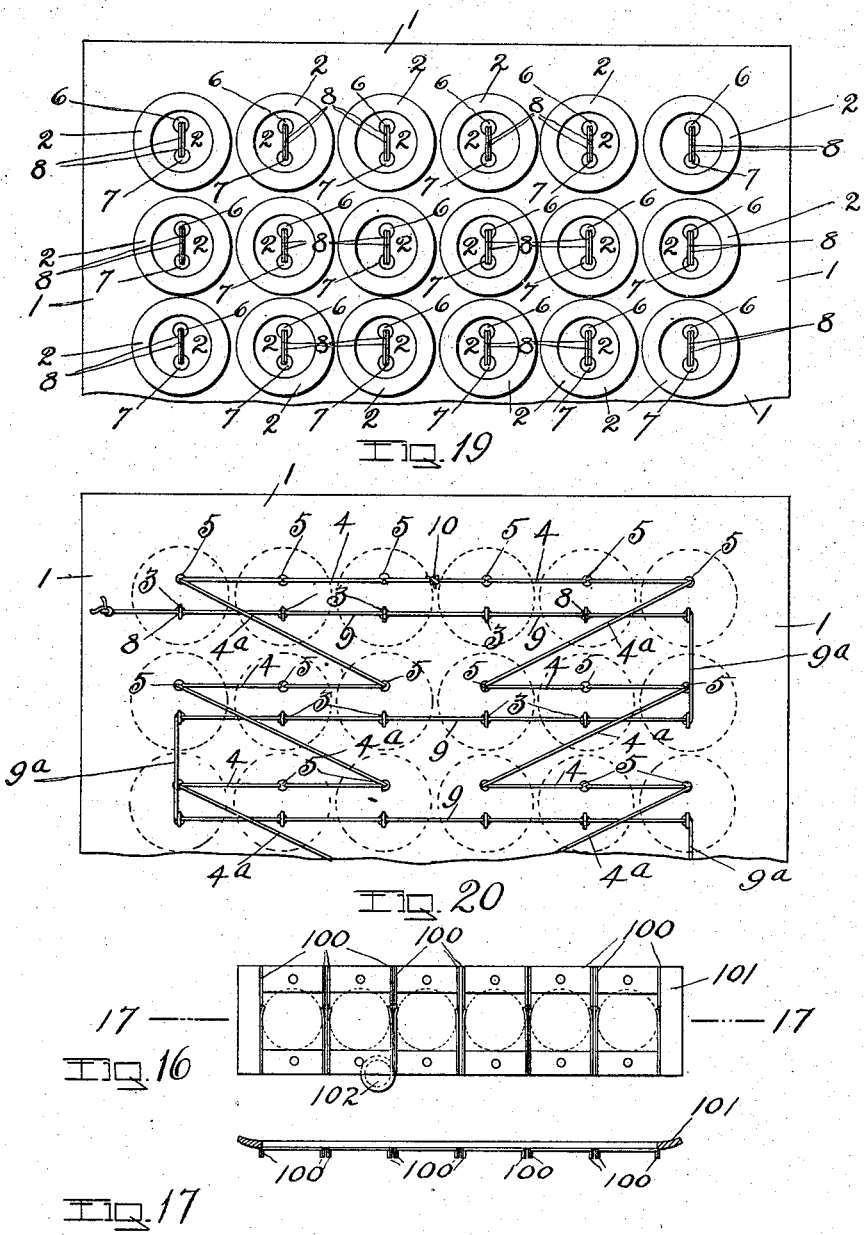
WITNESSES
J. Donsbach
E. Snyder
INVENTOR
Ezra G. Denniston
By Mosher & Curtis
attys.

UNITED STATES PATENT OFFICE.

EZRA G. DENNISTON, OF AMSTERDAM, NEW YORK.

MACHINE FOR ATTACHING BUTTONS ON CARDS.

1,145,353. Specification of Letters Patent. Patented July 6, 1915.

Application filed May 19, 1908. Serial No. 433,655.

*To all whom it may concern:*

Be it known that I, EZRA G. DENNISTON, a citizen of the United States, residing at Amsterdam, county of Montgomery, and State of New York, have invented certain new and useful Improvements in Machines for Attaching Buttons on Cards, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 1 of the drawings is a view in side elevation, partly in vertical section, of my improved machine for sewing buttons to cards, showing the needles raised. Fig. 2 is a similar view showing the needles depressed. Fig. 3 is a view in elevation, partly in section, of the opposite side of the machine from that seen in Figs. 1 and 2, showing the needles depressed. Fig. 4 is a horizontal cross-section taken on the broken line 4—4 in Fig. 1, through the base of the overhanging arm, showing in top plan the mechanisms subjacent to the bed-plate of the machine. Fig. 5 is a horizontal cross-section taken on the broken line 5—5 in Fig. 1, through the base of the overhanging arm, showing in elevation the bed-plate of the machine and certain of the devices mounted thereupon. Fig. 6 is a vertical cross-section taken on the broken line 6—6 in Fig. 1, showing in end elevation the head of the machine. Fig. 7 is a horizontal cross-section taken on the broken line 7—7 in Fig. 6, showing in top plan the mechanism for rocking the several needle bars. Fig. 8 is a vertical cross-section taken on the broken line 8—8 in Fig. 7, viewed in the direction of the arrow. Fig. 9 is a vertical cross-section taken on the broken line 9—9 in Fig. 1, viewed in the direction of the arrow. Fig. 10 is a vertical section taken on the broken line 10—10 in Fig. 1, through the axis of the shuttle-actuating cam-roll. Fig. 11 is a top plan view of the plate immediately beneath the bed-plate containing the raceway for the shuttle-carrier and the guideway for the movable thread-guides. Fig. 12 is a vertical section taken on the broken line 12—12 in Fig. 5, drawn on a greatly enlarged scale, showing the needle at the limit of its downward movement through the first eye of the button. Fig. 13 is a similar view showing the needle elevated and carrying a loop of thread up through the card and said first eye of the button. Fig. 14 is a similar view showing the needle with said loop of thread carried by said needle down through the other eye of the button. Fig. 15 is a similar view showing the needle partly withdrawn from the position shown in Fig. 14, and rocked on its axis to release the loop of thread from the needle hooks, and showing said loop thereby forced out into the path of the shuttle. Fig. 16 is a bottom plan view of the button-holder having chucks for a row of buttons. Fig. 17 is a vertical longitudinal section of the same taken on the broken line 17—17 in Fig. 16. Fig. 18 is a view in perspective of one of the chucks detached from the button-holder. Fig. 19 is a plan view of the face of a card of buttons produced in accordance with my invention. Fig. 20 is a plan view of the back of the same.

The principal object of the invention is to facilitate, and render more secure, the attachment of buttons to cards by means of threads. In attaining this object, I employ a novel machine for forming the thread-connections between the buttons and card by my novel method, thereby producing a novel card of buttons characterized by a novel arrangement of threads whereby the buttons are secured to the card.

The product of the preferred method carried on by means of the preferred form of my machine is shown in Figs. 19 and 20, in which, 1, represents the card and, 2, the buttons mounted upon one side of the card. Each button has two eyes, and the buttons are arranged in rows transversely of the card with the eyes of the several buttons in lines extending longitudinally of the card. Each button is secured on the face of the card by a looped portion, 3, of a thread, 4, passed from the back or opposite side of the card through the card at, 5, and through a button-eye at, 6, then back through the other button-eye at, 7, and the card at, 8, to said opposite side of the card, leaving the end of the loop exposed at the back of the card where it is secured by a locking thread, 9, inserted through the loop. The thread, 4, has thus a loop, 8, for each button in each row extending transversely of the card, and the locking thread, 9, passes through all of the loops, 3, whereby the buttons of an entire row are secured.

As will be hereinafter explained, the thread, 4, is made up of two threads tied together at, 10, with the effect of using a single thread the middle portion of which is at the point 10. The thread, 4, extends by oblique stretches, 4ª, from the end buttons of a preceding row to the middle two buttons respectively of the next successive row, and from these outward to the outermost buttons respectively in said next successive row, looped portions of said thread being passed from the back of the card each through one eye of a button in said next successive row, back through the other eye of said button, and through the card to the back thereof, where all the loops of the latter row are secured by a continuation of the thread 9. The thread, 9, extends in one direction transversely of the card through the loops, 3, whereby one row of buttons is secured; then longitudinally of the card to the next successive row of buttons, and then in the opposite direction transversely of the card through the loops, 3, in said next successive row of buttons, and so on indefinitely; while the thread, 4, extends from the outermost buttons in a preceding row to the middle two buttons respectively in each successive row indefinitely. By this method of attaching the buttons to the card, the only threads exposed to view on the face of the card are the loops passing from eye to eye of each button, there being exposed on the face of the card no thread extending from button to button.

An important feature of my invention consists in sewing mechanism whereby buttons can be attached in the manner above described to produce a card of buttons as shown. Referring to the drawings, wherein said sewing mechanism or machine is shown in preferred form, 12, is the bed-plate of the machine mounted upon a base, 13, said base having also mounted thereon the overhanging arm, 14, terminating in the head, 15, upon which head is pivotally mounted, upon a vertical axis at, 16, the oscillatory yoke, 17, containing slide bearings for the needle-bar, 18, adapted to be reciprocated at certain times longitudinally in the slide-bearings in said yoke by means of a link-connection, 19, with one arm of a lever, 20, fulcrumed at, 21, upon the overhanging arm, 14, and connected by means of a pitman, 22, with an eccentric, 23, fixed upon the main shaft, 24, of the machine, to which shaft rotary movements can be imparted by means of the crank-handle, 25, or in any other known manner.

Oscillating movements are imparted to the yoke, 17, at certain times by means of a rocker-arm, 26, fixed upon a rock-shaft, 27, and pivotally connected at, 28, with an arm, 29, fixed upon said yoke, 17, whereby said yoke, 17, is caused to oscillate in accordance with the rocking movements of the shaft, 27. The rock-shaft, 27, has also fixed thereon a rocker-arm, 30, connected by a link, 31, with a lever, 32, fulcrumed at, 33, upon the post of the overhanging arm, 14, said lever, 32, having on its lower end a yoke, 34, adapted to receive the cam-wheel, 35, fixed upon the gear, 36, rotatively mounted upon a stud fixed upon the post of the overhanging arm. The gear, 36, meshes with, and is driven by, a pinion, 37, fixed on the main shaft 24.

Fixed upon the lower end of the needle-bar, 18, is a head, 38, upon which are rotatively mounted a plurality of needle-posts, 39, each carrying a needle 40. Fixed upon each of said needle-posts, 39, is a rocker-arm, 41, all of said rocker-arms, 41, being pivotally connected with a common link, 42, by longitudinal reciprocation of which the needle-posts are adapted to be rocked on their respective axes through an arc of substantially 90 degrees, as indicated by dotted lines in Fig. 7.

Reciprocating movements are imparted to the link, 42, at certain times by means of a post, 43, which projects upward from a slide, 44, movable along a slideway in the base of the machine, and having a depending arm, 46, carrying a cam-follower, 47, adapted to occupy a cam-groove, 48, in the cam-wheel, 49, fixed upon a cam-shaft, 50, rotatively mounted in bearings on the base of the machine beneath the bed-plate, and adapted to be driven from the main drive-shaft, 24, through the intermeshing pinion, 51, on said main shaft, and the gear, 52, on said cam-shaft, 50, as shown in Fig. 4.

The end of the link, 42, through which the post, 43, passes is offset, as shown at 54, and provided with an elongated slot, 55, to provide for the transverse movement of the link, 42, induced by the oscillating movement of the yoke, 17, and this slotted end of said link, 42, is adapted to slide freely up and down upon the post, 43, as said link accompanies the needle-bar, 18, in its vertical, reciprocating movements.

Beneath the bed-plate, adjacent to the path of vertical, reciprocating movement of the needles in one position of the yoke, 17, is a shuttle-raceway, 56, open on the side toward said needles, and adapted to receive and form a slideway for a shuttle-carrier, 57, which shuttle-carrier is formed with a recess, 58, open at its opposite ends and on the side toward the needles, and adapted to receive a double-pointed shuttle, 59, which is loosely confined within said recess, and is of a size adapted to permit the free passage of loops of thread delivered by the respective needles between said shuttle and the walls of said recess. The shuttle-carrier, 57, has depending therefrom a cam-follower, 60, adapted to occupy a spiral cam-groove, 61, in the cam-roller, 62, upon the shaft of which is fixed a pinion, 63, in mesh with a sliding gear-rack, 64, reciprocatory in a slideway, 53, in the base of the machine.

Reciprocating movements are imparted to the rack, 64, by means of a lever, 65, fulcrumed at, 66, one end of which lever has a pin-and-slot connection at, 67, with said gear-rack, 64, and the other end of which lever has a cam-follower, 68, adapted to occupy the double-grooved cam-raceway, 69, on the periphery of the cam-wheel 49. The lever, 65, is offset from the plane of the gear-rack, 64, to the plane of the top of the cam-wheel, 49, as shown in Figs. 1, 2 and 9.

The bed-plate of the machine is apertured, as shown at, 70, to permit the several needles to pass down therethrough adjacent to the open side of the shuttle-raceway, and is also apertured at, 71, to permit the needles to pass down therethrough at a distance from the aperture, 70, equal to the distance between the two eyes of a button of the style for which the machine is adapted.

The aperture, 71, is in the form of a continuous slot which is also adapted to form a guideway for a pair of thread-guides, 72, movable toward and from each other in said slot. Said thread-guides, 72, are adapted to be so moved from the position shown by solid lines in Fig. 5, in which position they are outside of the outermost needles, to the position indicated by dotted lines in said figure, in which position said guides occupy positions contiguous to each other, and between the middle two needles. Adjacent to the outermost positions occupied by the movable thread-guides, 72, are stationary thread-guides, 73, for the thread from two spools, 74, supported upon the respective posts or spindles and frictionally held thereon by the thumb-nuts 76.

The movable thread-guides, 72, are fixed each to a slide, 78, movable in a slideway, 82, in the base of the machine, each having a depending arm, 79, on the end of which is a cam-follower adapted to occupy one of the two spiral grooves, 80, in the cam-roll, 81, beneath the bed of the machine, one of said spiral grooves being provided for each of said movable thread-guides. Fixed upon the shaft of the cam-roll, 81, is a pinion, 83, adapted to mesh with a gear-rack, 84, movable along a slideway, 85, in the base of the machine.

Reciprocating movements are imparted to the rack, 84, by means of a lever, 86, fulcrumed at, 87, one end of which lever has a pin-and-slot connection at, 88, with said gear-rack, 84, and the other end of which lever has a cam-follower, 89, adapted to occupy the double-grooved cam-raceway, 90, on the periphery of the cam-wheel, 91, fixed upon the main shaft, 24, of the machine. The lever, 86, is offset from the plane of the gear-rack, 84, to the plane of the top of the cam-wheel, 91, as shown in Figs. 3 and 9.

Movably mounted upon the upper surface of the bed-plate of the machine is a work-holder comprising a plate, 92, having a clamp, 93, mounted thereon, and adapted to be forced toward the plate by means of a cam 94. The card to which the buttons are to be attached by my improved machine is clamped at one end between said plane and clamp. The plate, 92, is provided with a longitudinal slot, 95, adapted to receive a stationary guide, 96, whereby the plate, 92, is guided in its movements along the bed-plate of the machine. On one edge of the plate, 92, is a gear-rack, 97, adapted to mesh with a pinion, 98, having fixed thereto a crank-handle, 99, whereby the pinion, which is rotatively mounted upon the bed, can be rotated in opposite directions to impart reciprocating movements to the plate 92.

The buttons for each row to be attached to the card are supported upon the face of the card by means of the individual chucks, 100, mounted upon the chuck-head or button-holder, 101, fixed upon the lower end of the chuck-post, 102, which post is capable of a reciprocating vertical movement in a bearing in the head, 15, of the overhanging arm. A spring, 103, tends to force the chuck-post downward to carry the chuck-supported buttons against the upper surface of the card on the bed, and said post is adapted to be supported in raised position by a cam, 104, while the buttons are being inserted in the chucks. The chucks are adapted to yieldingly hold the respective buttons inserted therein, and to permit the buttons when attached to the card to be forced through the chucks to accompany the card when the card is moved along the bed. Each needle is provided near its point with oppositely facing hooks, 105 and 106, separated by a lateral opening, 107, out of which the thread can freely pass when not under tension within one of the hooks.

The operation of attaching the buttons to the card is as follows, the movements of the several parts of the machine being timed to accomplish such operation. A card is inserted in the card-holder and the buttons for a single row are inserted by hand or in any known manner in the respective chucks, and the chucks lowered upon the card, each button being arranged with its two eyes in a line extending longitudinally of the card. The ends of the threads from the two spools, 74, 75, are tied together so that said threads together extend beneath the card across the whole line of needles on the side thereof toward which the lateral openings, 107, in the needles face, the thread-guides, 72, being contiguous to each other in the position indicated by dotted lines in Fig. 5. A reciprocating vertical movement is imparted to the needles through the needle-bar, causing the needles to descend, each through one eye, 6, of one of the row of buttons, and through the card, at 5, to the position shown in Fig. 12, and then to return to the elevated position shown in Fig. 13. As the needles return to the elevated position shown in Fig. 13, the thread enters the lower hook of each needle through the opening, 107, and a loop, 3, of said thread is thereby drawn upward through the card at 5, and one eye, 6, of the button 2. For the initial operation it may be found necessary or desirable to draw the thread against the needles to cause it to enter the several needle hooks. This may be done by hand or by passing the thread over the juxtaposed thread-guides 72. After the needles have completed this first reciprocating movement, the thread-guides, 72, are automatically moved apart in the manner above described to the respective positions shown by solid lines in Fig. 5. When the needles are returned to the raised position shown in Fig. 13, the yoke, 17, is swung laterally to bring the respective needles in line with the other eyes, 7, of the respective buttons, and with the needle-aperture, 70, in the bed, in which position a vertical reciprocating movement is imparted to the needles causing them to descend through the respective other eyes, 7, of the buttons and through the card to the position shown in Fig. 14. The swinging movement of the yoke, 17, and consequent movements of the needles cause the needles to pull upon the several loops carried by the respective needles, so that as each needle begins to descend in its new position its loop of thread is drawn into the upper hook, 105, and carried thereby down through the other eye, 7, of the button and the card to a point somewhat below the plane of the shuttle-raceway, as shown in Fig. 14. The return movement of the needle from this lowermost position leaves the thread slack, and as the slack loop is forced upward by the lower hook of the needle said loop is forced out into the neighboring shuttle-raceway, and, by the time the hooked part of the needle has reached a point opposite said raceway, said loop will be of sufficient size to receive the shuttle and permit the same to be forced therethrough, such position being shown in Fig. 15. As the needles reach the position last referred to, they are automatically rocked upon their respective axes in the manner above described, causing the openings, 107, to face in a direction at right angles to that in which they face to receive the thread, which rocking movement of the needles tends to free and release the thread from the hooks thereof, such release being fully accomplished by the pull exerted upon the thread by the frictional contact of the shuttle as the same passes through the several loops 3. The double cam-groove, 69, causes a practically instantaneous movement of the lever, 65, and the shuttle-actuating cam-roll, 62, which movement is timed to occur when the parts are in substantially the position shown in Fig. 15. The shuttle-thread, 9, is thus carried through all of said loops, leaving the shuttle at the opposite end of said raceway from which it started, where it remains until a new set of loops is presented in its path. From the position shown in Fig. 15, the needles return to their original initial position preliminary to a repetition of the above described operation. At the conclusion of the operation thus far described, the threads from the respective spools, 74, extend beneath the card to the loops of the respective end buttons of the last attached row on the card. The card is then moved along the bed by means of the crank-operated pinion, 98, and gear-rack, 97, a distance equal to the distance between two successive rows of buttons, thereby withdrawing the attached row of buttons from the chucks. The chucks are then raised, again supplied with buttons, and lowered upon the card preparatory to a repetition of the above described operation. This movement of the card will cause the respective threads from the spools, 74, to be drawn directly from the respective guides, 73, in lines substantially longitudinal of the card, but before the needles again descend to begin the next cycle of movements the movable thread-guides, 72, are brought together to the position indicated by dotted lines in Fig. 5, carrying the threads to the center of the machine, whereby the threads are drawn across the respective needles, and whereby the inclined stretches of thread, $4^a$, are formed. The operation can thus be repeated indefinitely, and with successive cards, it being necessary to tie together the ends of the two threads from the respective spools, 74, only when it is desired to separate the cards of buttons from each other.

The shuttle moves in one direction through the loops whereby one row of buttons is attached to the card, and in the opposite direction through the loops by which the next successive row of buttons is attached to the card. The feed-movement of the card thus forms short stretches, $9^a$, of the shuttle-thread extending longitudinally of the card from one row of buttons to the next, first along one side of the card, and then along the other, as shown in Fig. 20.

As, after each operation of the needles the card is shifted to bring the next button-row opposite the needles, such shifting movement will cause a pull of the thread, 4, upon the loops last formed, as well as upon the spools, 74. This, together with the inward movement of the thread-guides, 72, tends to take up the slack in the loops of the thread 4. The resistance offered by the spools, 74, to such pull upon the thread, 4, can be regulated by means of the thumb-nuts 76.

What I claim as new and desire to secure by Letters Patent is

1. In a machine of the class described, a card support, button supporting means for holding a button against one side of the card, said button having a plurality of eyes, a needle carrier on said side of the card, means for supporting a thread on the opposite side of the card, a hook needle mounted upon said carrier, means for moving said needle back and forth through the card and the eyes of the button to loop said thread therethrough, means for changing the relative positions of the needle and the button and card whereby the needle is caused to pass through the various eyes of the button, and means for passing a separate hold thread through the thread loops carried down through said button and card by said needle.

2. In a machine of the class described, and in combination, an apertured bed-plate adapted to support a button-card; a needle having opposite-facing hooks separated by a lateral opening; means for supplying a thread to said needle adjacent to an aperture in said bed-plate; a shuttle-raceway beneath another aperture in said bed-plate; a thread-carrying shuttle movable along said raceway; means for supporting a button upon the face of said card with a button-eye in line with each of said bed-plate apertures; a laterally shiftable needle-carrier; means for shifting said carrier from time to time to bring said needle successively into line with the respective bed-apertures; means for causing a reciprocating movement of the needle while in line with each of said bed-plate apertures; and means for moving said shuttle along its raceway during the return movement of the needle through the bed-plate aperture adjacent to said raceway; and means for imparting to said needle a rocking movement to release the thread therefrom during said return movement of the needle.

3. In a machine of the class described, and in combination, a bed-plate adapted to support a button-card; a work-holder adapted to hold said card in position upon said bed; means for imparting to said work-holder a progressive movement at certain times; means for supporting a button upon the face of said card, with two eyes of the button above an apertured portion of the bed-plate; a needle having oppositely facing hooks separated by a lateral opening; a laterally shiftable needle carrier; means for shifting said carrier from time to time to bring said needle successively into line with the respective button-eyes; means for causing a reciprocating movement of the needle while in line with each of said button-eyes; means for supplying a thread to said needle when in line with one of said button-eyes; a shuttle raceway below the bed-plate adjacent to the path of the needle when in line with the other of said button-eyes; a thread-carrying shuttle movable along said raceway; means for moving said shuttle along its raceway during the return movement of the needle when adjacent thereto; and means for imparting to said needle a rocking movement to release the thread therefrom into the path of said shuttle during said return movement of the needle.

4. In a machine of the class described, and in combination, an apertured bed-plate; a laterally shiftable needle carrier; a plurality of needles carried by said needle carrier, each having oppositely facing hooks separated by a lateral opening; means for shifting said carrier laterally at certain times from one to another of two positions; means for causing a reciprocating movement of said needles through the bed-plate in each of the two positions of its carrier; means for supplying a thread to each of said needles in one position of the needle carrier; a shuttle raceway adjacent to and open to each of said needles in the other position of said needle carrier; a thread-carrying shuttle movable along said raceway; means for moving said shuttle along its raceway during the return movement of said needles in the position adjacent to said raceway; and means for imparting to said needles severally a rocking movement to release the thread therefrom during said return movement of the needles.

5. In a machine of the class described, and in combination, an apertured bed-plate adapted to support a button-card; a work-holder adapted to hold said card in position upon said bed-plate; a needle-bar; a head on said needle-bar; a laterally oscillatory support containing a slide-bearing for said needle-bar; means for oscillating said support at certain times; a plurality of needle posts rotatively mounted in said head; means for rocking said posts at certain times; needles mounted in the respective posts, each needle having oppositely facing hooks separated by a lateral opening; means for supporting upon the face of said card a plurality of buttons each having a plurality of eyes, with one eye of each button in line with one of said needles in one position thereof, and another eye in line with said needle in another position thereof; means for imparting to said needle-bar reciprocating longitudinal movements in each of said positions of the several needles; means for supplying loops of thread to the hooks of said needles at the back of said card during the longitudinal reciprocating movement of said needles in one of said positions; a shuttle raceway beneath said bed-plate adjacent to the path of longitudinally reciprocating movement of said needles in the other of said positions; a thread-carrying shuttle movable along said raceway; and means for moving said shuttle along its raceway during the return movement of the needles when in a position adjacent thereto.

6. In a machine of the class described, and in combination, a support for a card; a plurality of button-holding devices adjacent to the front of said card; a needle-carrier on the front side of said card; means for supplying a thread at the back of said card; a plurality of hook-needles mounted upon said needle-carrier; means for moving said needles back and forth through said card and the respective button-eyes; and means for inducing a relative sidewise movement between said card and buttons and the respective needles, whereby the respective needles are brought opposite first one and then the other of the eyes of the respective buttons.

In testimony whereof, I have hereunto set my hand this 17th day of April, 1908.

EZRA G. DENNISTON

Witnesses:
HARRY SHERBURNE,
AMBROSE I. FITZJAMES.

Copies of this patent may be obtained for five cents each, by addressing the "Commissioner of Patents, Washington, D. C."